United States Patent
Codina et al.

[11] Patent Number: 6,163,088
[45] Date of Patent: Dec. 19, 2000

[54] METHOD AND APPARATUS FOR PROVIDING STANDBY POWER FROM A GENERATOR USING CAPACITOR SUPPLIED VOLTAGE

[75] Inventors: George Codina, Playa del Rey, Calif.; Thomas J. Richards, Peoria, Ill.

[73] Assignee: Caterpillar Inc., Peoria, Ill.

[21] Appl. No.: 09/408,632

[22] Filed: Sep. 30, 1999

[51] Int. Cl.[7] .................................................... H02J 7/00
[52] U.S. Cl. ............................................. 307/64; 307/109
[58] Field of Search .............................. 290/52; 324/382; 320/167; 340/438; 307/10.1, 64, 109

[56] References Cited

U.S. PATENT DOCUMENTS

| | | | |
|---|---|---|---|
| 4,127,782 | 11/1978 | Omura et al. | 307/10 R |
| 4,835,513 | 5/1989 | MuCurdy et al. | 340/438 |
| 5,157,267 | 10/1992 | Shirata et al. | 290/38 R |
| 5,260,637 | 11/1993 | Pizzi | 320/6 |
| 5,572,108 | 11/1996 | Windes | 320/1 |
| 5,623,209 | 4/1997 | Lepley et al. | 324/382 |
| 5,818,115 | 10/1998 | Nagao | 290/31 |
| 6,031,294 | 2/2000 | Geis et al. | 290/52 |

*Primary Examiner*—Josie Ballato
*Assistant Examiner*—Sharon Polk
*Attorney, Agent, or Firm*—Steven D. Lundquist

[57] ABSTRACT

A method and apparatus for providing standby power from a generator. The method and apparatus includes determining a power failure condition of a primary power source, disconnecting the primary power source from a load, connecting the generator to the load, connecting a first capacitor supplied voltage to a starter system, activating the starter system to start the generator, and providing a second capacitor supplied voltage to a capacitor monitor/diagnostics controller during a transition period between the primary power source and the generator standby power.

17 Claims, 4 Drawing Sheets

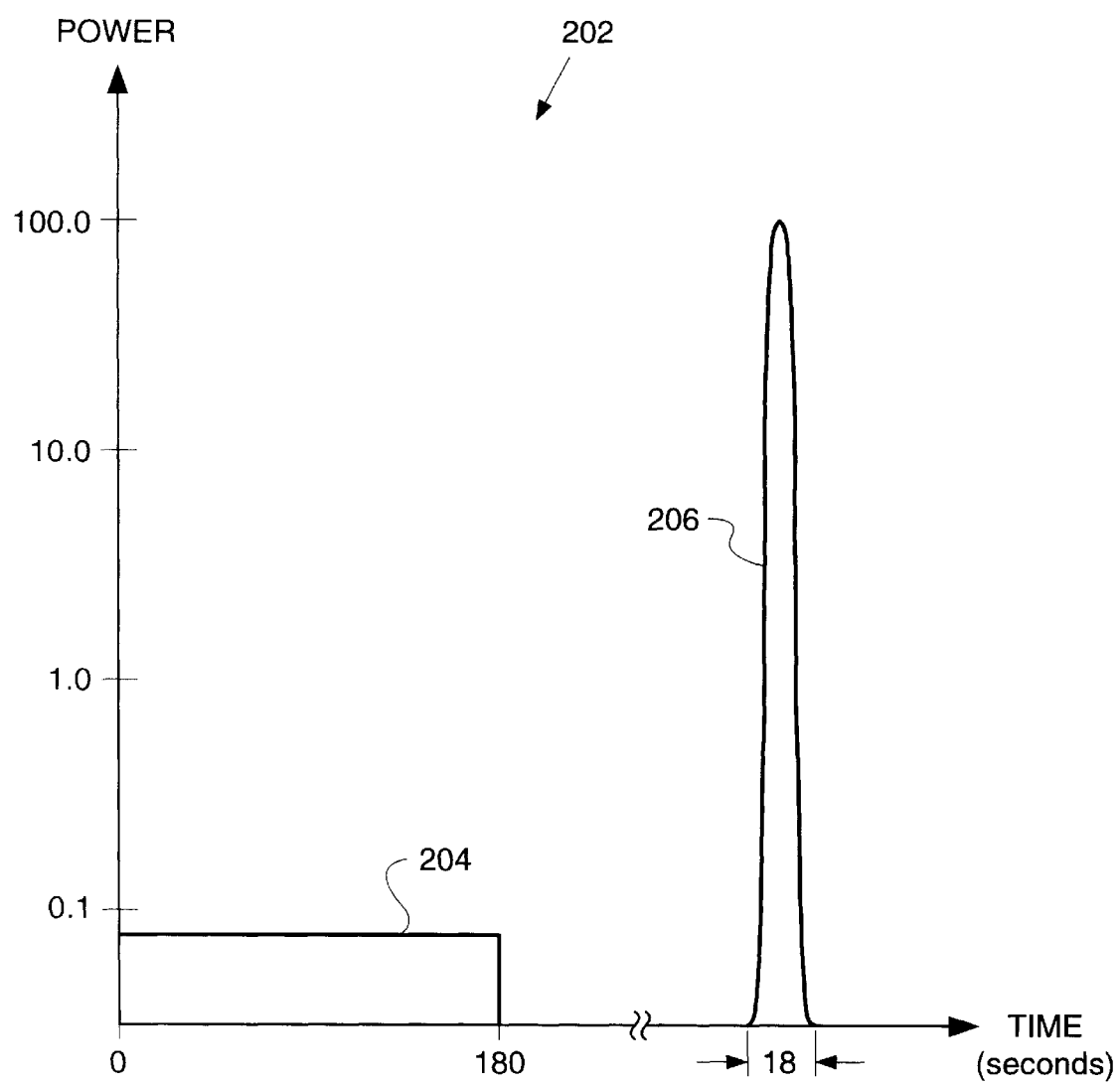

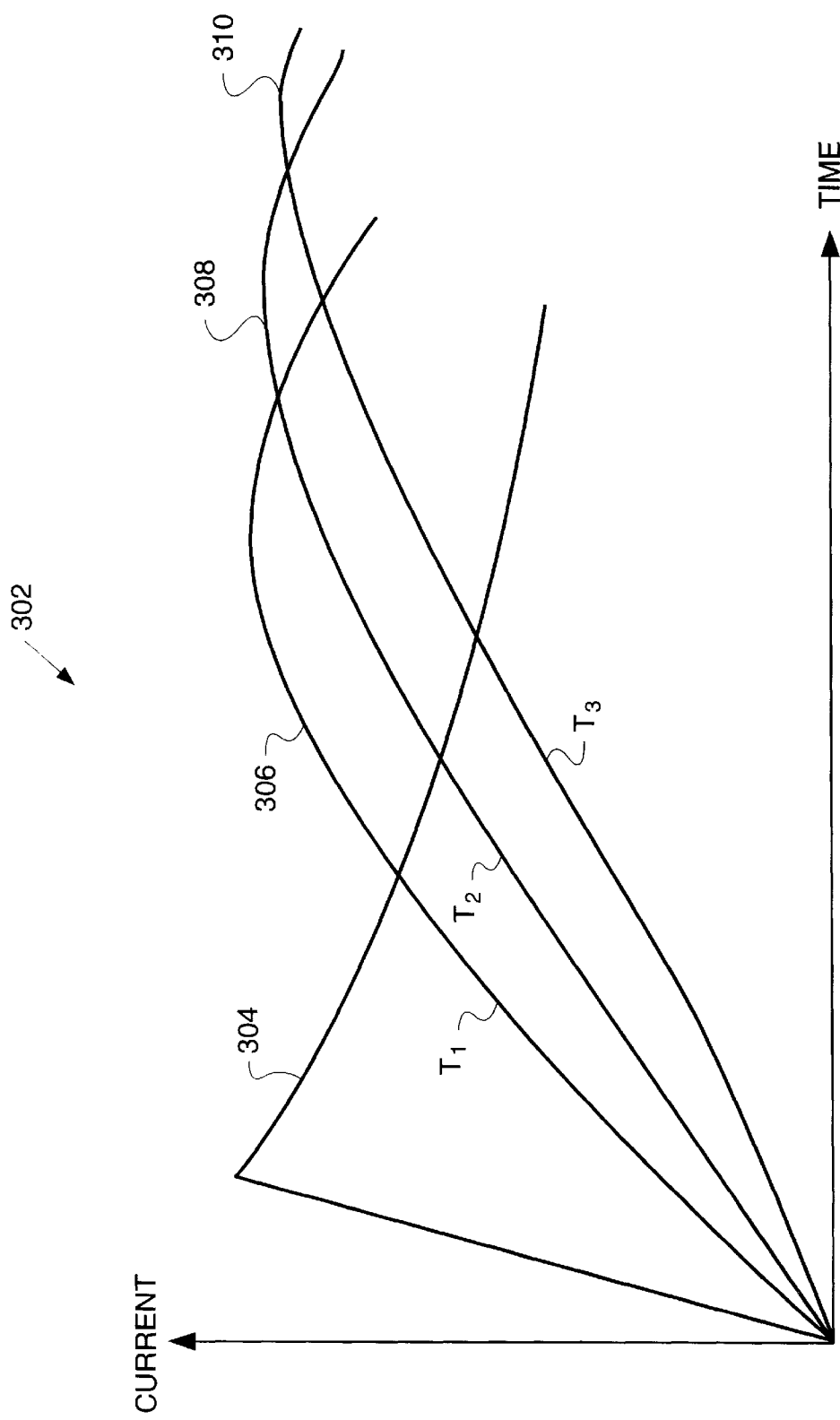

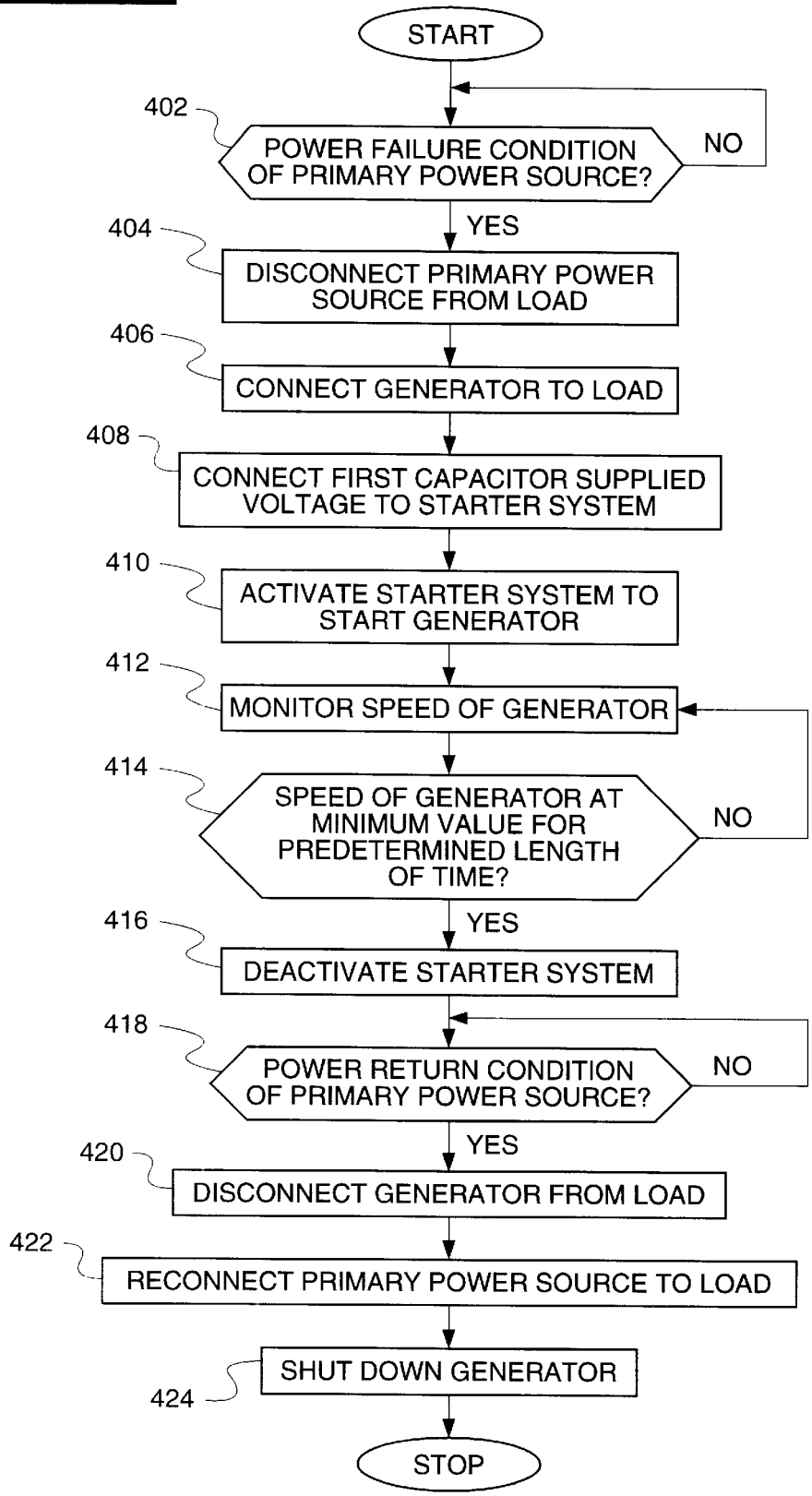

METHOD AND APPARATUS FOR PROVIDING STANDBY POWER FROM A GENERATOR USING CAPACITOR SUPPLIED VOLTAGE

TECHNICAL FIELD

This invention relates generally to a method and apparatus for providing standby power from a generator and, more particularly, to a method and apparatus for starting a standby power generator using capacitor supplied voltage.

BACKGROUND ART

It has long been a common practice to start standby power generators using the energy stored in batteries to drive starter motors, which in turn crank the generator until the generator starts. However, the load placed upon the batteries reduces the life of service of the batteries significantly. A typical battery for starting a standby power generator may only have a useful life of about three years. In addition, the energy output of even a good battery may be severely reduced when used under extreme temperature conditions.

Advances have been made in technology regarding capacitors, which are capable of storing electrical energy, but until recently were not capable of storing the amounts of energy needed to start a generator. However, large capacitance capacitors, for example electric double layer capacitors, have been developed which are capable of storing large amounts of electrical energy. These capacitors are sometimes known as super capacitors, and are finding use in applications such as in engine starting circuits.

For example, in U.S. Pat. No. 5,157,267, Shirata et al. (Shirata) disclose an apparatus for starting an engine which uses a capacitor in parallel with a starting battery. The battery charges the capacitor through a boost controller, i.e., a DC to DC inverter, to a voltage slightly higher than the battery voltage. For example, for a battery voltage of 12 volts, the capacitor would be charged to 14 volts. The energy stored in the capacitor is then used to start the engine, as the battery continues to charge the capacitor during the start cycle.

Although the apparatus of Shirata uses a capacitor to start an engine, the battery must still continue to work under load to maintain a charge on the capacitor. Therefore, the battery must still be subjected to the stresses of continual quick-draining charge-discharge cycles, thus shortening the useful life of the battery. It would be desirable to provide a starting system for a standby power generator which did not subject the battery to constant discharging and charging during the starting process.

The present invention is directed to overcoming one or more of the problems as set forth above.

DISCLOSURE OF THE INVENTION

In one aspect of the present invention a method for providing standby power from a generator is disclosed. The method includes the steps of determining a power failure condition of a primary power source, disconnecting the primary power source from a load, connecting the generator to the load, connecting a first capacitor supplied voltage to a starter system, and activating the starter system to start the generator.

In another aspect of the present invention an apparatus for providing standby power from a generator is disclosed. The apparatus includes a transfer switch for determining a power failure condition of a primary power source, disconnecting the primary power source from a load, and connecting the generator to the load. The apparatus also includes a starter system for controllably starting the generator, and a capacitor for providing a first capacitor supplied voltage to the starter system.

BRIEF DESCRIPTION OF THE DRAWINGS

FIG. 2 is a power vs. time graph illustrating charging and discharging times of a capacitor used in the circuit of FIG. 1;

FIG. 3 is a current vs. time graph illustrating current delivery vs. time of a capacitor and a battery; and FIG. 4 is a flow diagram illustrating a preferred method of the present invention.

BEST MODE FOR CARRYING OUT THE INVENTION

Figure 1:
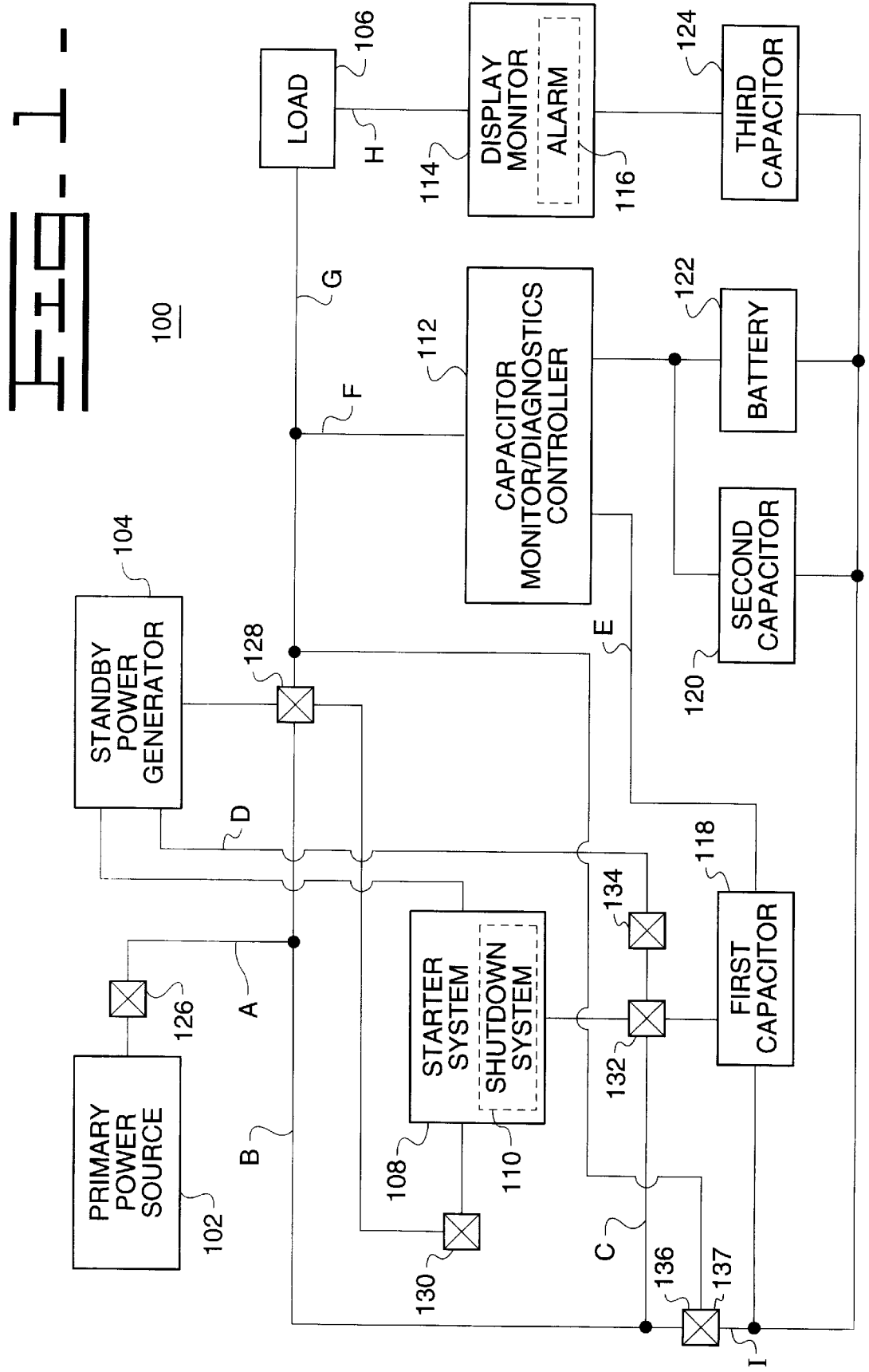
FIG. 1 is an electrical block diagram illustrating a preferred embodiment of the present invention.

Referring to the drawings, and with particular respect to FIG. 1, a diagrammatic illustration of a preferred embodiment of the present invention is shown. It is noted that the embodiment shown in FIG. 1 is illustrative of but one aspect of a preferred apparatus 100 suitable for use with the present invention. Variations of the apparatus 100 may be employed which are suitable for use with the invention as described below with respect to the specification and the accompanying claims.

A primary power source 102 provides primary electrical power to a load 106. The primary power source may be of any type well known in the art, such as electrical power provided by an electrical power utility company, or an electrical power generating station of some type.

A standby power generator 104 having a capacity suitable for providing standby electrical power to the load 106 is available to provide standby power during periods of time of power failure of the primary power source 102. Typically, the standby power generator 106 is driven by an internal combustion engine (not shown) as is well known in the art.

A transfer switch 128, electrically connected between the primary power source 102, the standby power generator 104, and the load 106, is adapted to determine a power failure condition of the primary power source 102, disconnect the primary power source 102 from the load 106, and connect the standby power generator to the load 106. In addition, the transfer switch 128 is adapted to enable a starter system enable switch 130, which in turn is adapted to enable a starter system 108.

Preferably, the starter system 108 is of a type typically used to start internal combustion engines, and is therefore well known in the art.

A starter system activate switch 132 is adapted to sense the loss of electrical power from the primary power source 102 via electrical path A-B-C, and responsively activate the starter system 108 by connecting a first capacitor 118 to the starter system 108. In the preferred embodiment, the first capacitor 118 is of a type commonly known as a super capacitor, e.g., an electric double layer capacitor, and is capable of storing electrical energy sufficient to provide a voltage to drive the starter system 108 to start the standby power generator 104.

A starter system deactivate switch 134 monitors the speed of the standby power generator 104 via path D, and is adapted to cause the starter system activate switch 132 to disconnect the first capacitor 118 from the starter system 108 in response to the speed of the generator 104 being a predetermined minimum value for a predetermined length of time, thus stopping the starting operation of the starter system 108. For example, if the speed of the generator 104 is determined to be 1500 rpm for 5 seconds, the generator 104 is determined to be running, and the starter system 108 is disengaged.

The transfer switch 128 is further adapted to determine a power return condition of the primary power source 102, and responsively disconnect the standby power generator 104 from the load 106, and reconnect the primary power source 102 to the load 106. In addition, the transfer switch 128 is adapted to shut down the standby power generator 104 by disengaging the starter system enable switch 130 which responsively activates a shutdown system 110, which is part of the starter system 108.

A capacitor monitor/diagnostics controller 112 is adapted via path E to monitor the energy storage of the first capacitor 118, and to periodically discharge and charge, i.e., exercise, the first capacitor 118 to maintain a maximum desired energy storage. In addition, the capacitor monitor/diagnostics controller 112 is adapted to generate a signal indicating the condition of the first capacitor 118, and to deliver the signal to a display monitor 114, which is described in more detail below. In addition, the capacitor monitor/diagnostics controller 112 may be adapted to perform the above functions with second and third capacitors 120,124, although the corresponding paths to these capacitors, i.e., corresponding to path E, are not shown in FIG. 1.

In the preferred embodiment, the capacitor monitor/diagnostics controller 112 receives electrical power, during the transition period between the primary power source 102 and the standby power generator 104, from a second capacitor 120 in combination with a battery 122. Preferably, the second capacitor 120 is of the type commonly known as a super capacitor, and provides the voltage to the capacitor monitor/diagnostics controller 112 during the transition period, and the battery 122 provides a charging voltage to the second capacitor 120. Alternatively, the second capacitor 120 may have a capacity to provide the voltage directly without the use of a battery to charge the second capacitor 120. In this alternative embodiment, the battery 122 would not be used.

A display monitor 114 is adapted to display a status condition of at least one of the primary power source 102, the standby power generator 104, the starter system 108, and the first capacitor 118. In addition, the display monitor 114 may be adapted to display other types of information including, but not limited to, the status of the transfer switch 128, additional operating parameters of the standby power generator 104, the status of other switches in the apparatus 100, and the like.

In one embodiment, the display monitor receives information through the electrical paths in the apparatus 100. For example, the status of the first capacitor 118 may be delivered to the display monitor 114 from the capacitor monitor/diagnostics controller 112 via path F-G-H.

In another embodiment, the display monitor 114 is located at a remote location and the information is delivered by some other means known in the art, such as telephone lines, wireless radio, microwave, dedicated lines, and the like.

Preferably, the display monitor 114 includes an alarm 116, either audio or visual or both, to notify operating personnel of status conditions requiring attention, such as failure of the primary power source 102, or an abnormal parameter of the standby power generator 104.

The display monitor 114 preferably receives electrical power, during the transition period between the primary power source 102 and the standby power generator 104, from a third capacitor 124. In the preferred embodiment, the third capacitor 124 is of the type commonly known as a super capacitor, and thus has the capacity to provide power to the display monitor 114 during the transition period.

The first, second, and third capacitors 118,120,124 are charged by either the primary power source 102 or the standby power generator 104 through a capacitor charge switch 136 via path I. The capacitor charge switch 136 is adapted to determine a failure of the primary power source 102 and switch to the standby power generator 104 in response. Preferably, the capacitor charge switch 136 includes an AC to DC converter 137 to provide a DC voltage to charge the first, second, and third capacitors 118,120,124.

A system test switch 126, connected in line with the primary power source 102 along path A, may be used to simulate failure of the primary power source 102 for testing and diagnostics purposes.

Referring now to FIG. 2, a graph 202 of power vs. time is shown. It is noted that the scales on the axis are exemplary only, and do not indicate any values that are necessary for the present invention. For example, the vertical axis, i.e., power, is not assigned any units of measurement, and the values given are merely arbitrary.

A representation 204 of power vs. time of the capacitor 118 charging illustrates that the capacitor 118 is charged for a relatively long period of time, for example 180 seconds, at low power. Under these conditions, the power drain is minimized during charging of the capacitor 118.

The power vs. time curve 206 of the first capacitor 118 discharging, for example, when used to drive the starter system 108 to start the standby power generator 104, indicates that the capacitor 118 discharges a large amount of power in a short period of time. For example, the capacitor 118 may discharge in about 18 seconds, or about one tenth of the time that it took to charge the capacitor 118. The process of charging the capacitor 118 at low power over a long period of time and then discharging the capacitor 118 at high power over a short period of time is known as energy compression, or pulse power. It is noted that the 180 second charge time, the 18 second discharge time, and the 10 to 1 energy compression ratio are merely examples used for purposes of illustration. Other charge and discharge times and ratios may be used without deviating from the invention.

Referring now to FIG. 3, a graph 302 of current vs. time is shown. It is noted that the axes of the graph 302 are not drawn to any scale and do not depict any units of measurement. The curves shown on the graph are being used to illustrate comparative features for purposes of illustration only.

A curve 304 of the current vs. time of the capacitor 114 illustrates that the capacitor 118 is capable of providing a maximum value of current quickly, which then slowly decreases as the capacitor 118 is discharged. It is noted that the curve 304 of the capacitor 118 is independent of temperature.

Curves 306,308,310 of the current vs. time of a battery (not shown), typically used to drive a starter system, at three temperatures $T_1,T_2,T_3$ illustrate that the battery takes longer than the capacitor 118 to provide maximum current for purposes of starting the standby power generator 104. In addition, $T_3$ is a lower temperature than $T_2$, which is a lower temperature than $T_1$. Therefore, as shown in the graph 302, as the temperature decreases, the length of time for the battery to reach maximum current output increases. This results in longer starting times in cold conditions, which places additional stress on the battery. In addition, the internal resistance of the battery 104 increases as the temperature decreases. The higher internal resistance lowers the maximum output current of the battery 104. Therefore, as shown in FIG. 3, as the temperature decreases, the maximum output current of the battery 104 decreases.

Referring now to FIG. 4, a flow diagram illustrating a preferred method of the present invention is shown.

In a first decision block 402, it is determined if a power failure condition of the primary power source 102 has taken place. Preferably, the transfer switch 128 is adapted to determine a loss of electrical power from the primary power source 102.

In a first control block 404, responsive to a determination of a power failure condition, the primary power source 102 is disconnected from the load 106 by the transfer switch 128. In a second control block 406, the standby power generator 104 is connected to the load 106 by the transfer switch 128.

Control proceeds to a third control block 408, where the first capacitor 118 is connected to the starter system 108, thus connecting the first capacitor supplied voltage to the starter system 108. In a fourth control block 410, the starter system 108 is activated in response to receiving the first capacitor applied voltage, thus responsively starting the generator 104.

In a fifth control block 412, the speed of the standby power generator 104, i.e., the speed of rotation of an internal combustion engine (not shown) which drives the generator 104, is monitored. If it is determined, in a second decision block 414, that the speed of the generator 104 has reached a minimum predetermined value for a predetermined length of time, the standby power generator 104 is assumed to have started and is running, and the starter system 108 is deactivated in a sixth control block 416.

In a third decision block 418, the primary power source 102 is monitored, preferably by the transfer switch 128, to determine if a power return condition takes place, i.e., that electrical power from the primary power source 102 is restored.

In a seventh control block 420, in response to the power return condition, the standby power generator 104 is disconnected from the load 106. In an eighth control block 422, the primary power source 102 is reconnected to the load 106. In a ninth control block 424, the generator 104 is shut down by the shutdown system 110.

INDUSTRIAL APPLICABILITY

As an example of an application of the present invention, the first, second, and third capacitors 118,120,124 are used to provide electrical power to the apparatus of FIG. 1 during the transition periods of time between the primary power source 102 and the standby power generator 104. The first, second, and third capacitors 118,120,124 are commonly known as super capacitors; that is, they each have a much greater capacity to store electrical energy than typical capacitors.

Historically, batteries have been used to provide the electrical power that is provided in the present invention by the first, second, and third capacitors 118,120,124. However, batteries require much more maintenance, have a much shorter useful life, e.g., about three years, and do not function well under extreme environmental conditions, such as extreme cold temperatures. The first, second, and third capacitors 118,120,124 are configured and chosen to have the storage capacity to provide the electrical power needed during transition periods without the inherent disadvantages of maintaining batteries in the system.

Other aspects, objects, and features of the present invention can be obtained from a study of the drawings, the disclosure, and the appended claims.

What is claimed is:

1. A method for providing standby power from a generator, including the steps of:

determining a power failure condition of a primary power source;

disconnecting the primary power source from a load;

connecting the generator to the load;

connecting a first capacitor supplied voltage to a starter system, the first capacitor supplied voltage being provided by a first capacitor;

activating the starter system to start the generator, the starter system being activated by the first capacitor supplied voltage; and providing a second capacitor supplied voltage to a capacitor monitor/diagnostics controller during a transition period between the primary power source and the generator standby power.

2. A method, as set forth in claim 1, further including the steps of:

monitoring the speed of the generator; and deactivating the starter system in response to the speed of the generator being a predetermined minimum value for a predetermined length of time.

3. A method, as set forth in claim 1, further including the steps of:

determining a power return condition of the primary power source;

disconnecting the generator from the load;

reconnecting the primary power source to the load; and activating a shutdown system to responsively shut down the generator.

4. A method, as set forth in claim 1, further including the steps of:

monitoring an energy storage of the first capacitor; and discharging and recharging the first capacitor to maintain a maximum desired energy storage.

5. A method, as set forth in claim 4, further including the step of transmitting a signal indicating a status condition of the first capacitor to a display monitor.

6. A method, as set forth in claim 5, wherein the capacitor monitor/diagnostics controller is adapted to monitor the energy storage of the first capacitor, controllably discharge and recharge the first capacitor, and transmit the status signal of the first capacitor to the display monitor.

7. A method, as set forth in claim 6, wherein the second capacitor supplied voltage is a battery in combination with a second capacitor.

8. A method, as set forth in claim 7, wherein the second capacitor provides the second capacitor supplied voltage, and the battery provides a charging voltage to the second capacitor.

9. A method, as set forth in claim 6, further including the step of displaying a status condition of at least one of the primary power source, the generator, the starter system, and the first capacitor on the display monitor.

10. A method, as set forth in claim 9, wherein the display monitor is provided with a third capacitor supplied voltage by a third capacitor during the transition period between the primary power source and the generator standby power.

11. An apparatus for providing standby power from a generator, comprising:
- a transfer switch for determining a power failure condition of a primary power source, disconnecting the primary power source from a load, and connecting the generator to the load;
- a starter system for controllably starting the generator;
- a first capacitor for providing a first capacitor supplied voltage to the starter system to enable the starter system for starting the generator;
- a capacitor monitor/diagnostics controller for monitoring the first capacitor; and
- a second capacitor for providing a second capacitor supplied voltage to the capacitor monitor/diagnostics controller during a transition period between the primary power source and the generator standby power.

12. An apparatus, as set forth in claim 11, wherein the transfer switch is further adapted for determining a power return condition of the primary power source, disconnecting the generator from the load, and reconnecting the primary power source to the load.

13. An apparatus, as set forth in claim 12, wherein the starter system includes a shutdown system to shut down the generator in response to the power return condition of the primary power source.

14. An apparatus, as set forth in claim 11, wherein the capacitor monitor/diagnostics controller is adapted to monitor the energy storage of the first capacitor, and to discharge and recharge the first capacitor to maintain a maximum desired energy storage.

15. An apparatus, as set forth in claim 14, further including a battery in combination with the second capacitor for providing a charging voltage to the second capacitor.

16. An apparatus, as set forth in claim 15, further including a display monitor for displaying a status condition of at least one of the primary power source, the generator, the starter system, and the first capacitor.

17. An apparatus, as set forth in claim 16, further including a third capacitor for providing a third capacitor supplied voltage to the display monitor during the transition period between the primary power source and the generator standby power.

* * * * *